United States Patent
Chaudhry et al.

(10) Patent No.: US 9,322,577 B2
(45) Date of Patent: Apr. 26, 2016

(54) WATER HEATER APPLIANCES AND METHODS FOR OPERATING SAME

(71) Applicant: General Electric Company, Schenectady, NY (US)

(72) Inventors: Gunaranjan Chaudhry, Bangalore (IN); Brent Alden Junge, Evansville, IN (US); Michael John Kempiak, Osceola, IN (US)

(73) Assignee: General Electric Company, Schenectady, NY (US)

(*) Notice: Subject to any disclaimer, the term of this patent is extended or adjusted under 35 U.S.C. 154(b) by 142 days.

(21) Appl. No.: 14/188,764

(22) Filed: Feb. 25, 2014

(65) Prior Publication Data

US 2015/0241093 A1   Aug. 27, 2015

(51) Int. Cl.
| | | |
|---|---|---|
| *F25B 29/00* | (2006.01) | |
| *F25B 6/04* | (2006.01) | |
| *F24D 17/02* | (2006.01) | |
| *F28D 20/00* | (2006.01) | |

(52) U.S. Cl.
CPC . *F25B 6/04* (2013.01); *F24D 17/02* (2013.01); *F28D 20/00* (2013.01); *F24D 2200/08* (2013.01); *F24D 2200/12* (2013.01); *F25B 2339/047* (2013.01); *F25B 2341/0012* (2013.01); *F25B 2341/0662* (2013.01); *F25B 2500/01* (2013.01)

(58) Field of Classification Search
CPC ........ F25B 29/003; F25B 29/00; F25B 30/02; F25B 6/04; F25B 2339/047; F25B 2341/0012; F25B 2341/0662; F25B 2500/01; F24D 2200/12; F24D 2200/08
USPC .......................................... 62/238.6, 160, 79
See application file for complete search history.

(56) References Cited

U.S. PATENT DOCUMENTS

| | | | | |
|---|---|---|---|---|
| 2,375,157 | A * | 5/1945 | Wilkes ...................... | F24H 4/04 165/62 |
| 4,215,551 | A * | 8/1980 | Jones .................. | F24D 11/0221 165/45 |
| 4,293,323 | A * | 10/1981 | Cohen ................... | F25B 29/003 165/142 |
| 4,350,024 | A * | 9/1982 | Moll ................... | F24D 11/0214 237/2 B |
| 4,356,706 | A * | 11/1982 | Baumgarten ......... | F25B 49/027 237/19 |
| 4,448,347 | A * | 5/1984 | Dunstan ................ | F25B 29/003 165/909 |
| 4,452,050 | A * | 6/1984 | Pierce ....................... | F24H 4/04 165/169 |
| 4,474,018 | A | 10/1984 | Teagan | |

(Continued)

FOREIGN PATENT DOCUMENTS

| | | |
|---|---|---|
| CN | 203010922 U | 6/2013 |
| WO | WO 2011/041768 | 4/2011 |

*Primary Examiner* — Mohammad M Ali
(74) *Attorney, Agent, or Firm* — Dority & Manning, P.A.

(57) ABSTRACT

Water heater appliances and methods for operating water heater appliances are provided. A water heater appliance includes a tank defining an interior volume, and a sealed system for heating water within the interior volume. The sealed system includes a compressor operable to compress refrigerant, and a first condenser downstream of and in fluid communication with the compressor. The first condenser is operable to heat water within the interior volume using energy from the refrigerant. The sealed system further includes a second condenser downstream of and in fluid communication with the first condenser. The second condenser is operable to heat water within the interior volume using energy from the refrigerant. The sealed system further includes an evaporator between and in fluid communication with the second condenser and the compressor.

14 Claims, 3 Drawing Sheets

(56) References Cited

U.S. PATENT DOCUMENTS

| | | | |
|---|---|---|---|
| 4,599,870 A * | 7/1986 | Hebert | F25B 40/00 62/238.6 |
| 2006/0213210 A1* | 9/2006 | Tomlinson | F24H 4/04 62/238.6 |
| 2008/0104986 A1* | 5/2008 | Gordon | F25B 30/02 62/238.7 |
| 2010/0209084 A1* | 8/2010 | Nelson | F24H 4/04 392/465 |
| 2012/0060521 A1* | 3/2012 | Roetker | F24H 4/04 62/79 |

* cited by examiner

WATER HEATER APPLIANCES AND METHODS FOR OPERATING SAME

FIELD OF THE INVENTION

The present subject matter relates generally to water heater appliances, such as heat pump water heater appliances, and methods for operating the same.

BACKGROUND OF THE INVENTION

Certain water heaters operate such that water within the water heater's tank is heated to a set temperature. Generally, a user can select the set temperature using a dial or other input on the water heater. Heat pump water heaters are gaining broader acceptance as a more economic and ecologically-friendly alternative to electric water heaters. Heat pump water heaters include a sealed system for heating water to the set temperature. Certain heat pump water heaters also include a supplemental or auxiliary heating element for heating water. Sealed systems are generally more efficient than auxiliary heating elements.

A typical sealed system includes a compressor, a condenser, a throttling device, and an evaporator. These components operate in a closed loop to manipulate a refrigerant. The refrigerant in turn exchanges energy with water in the tank of the water heater, heating the water.

As consumer demand and government regulation continue to encourage the development of high efficiency, low energy appliances, improvements to presently known appliance designs are desired. In particular, increases in efficiency and decreases in energy usage of presently known water heater appliances are desired.

BRIEF DESCRIPTION OF THE INVENTION

In accordance with one embodiment of the present disclosure, a water heater appliance is provided. The water heater appliance includes a tank defining an interior volume, and a sealed system for heating water within the interior volume. The sealed system includes a compressor operable to compress refrigerant, and a first condenser downstream of and in fluid communication with the compressor. The first condenser is operable to heat water within the interior volume using energy from the refrigerant. The sealed system further includes a second condenser downstream of and in fluid communication with the first condenser. The second condenser is operable to heat water within the interior volume using energy from the refrigerant. The sealed system further includes an evaporator between and in fluid communication with the second condenser and the compressor.

In accordance with another embodiment of the present disclosure, a method for operating a water heater appliance is provided. The method includes flowing a refrigerant through a compressor, flowing the refrigerant from the compressor through a first condenser surrounding a tank of the water heater appliance, and flowing the refrigerant from the first condenser through a second condenser surrounding the tank of the water heater appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
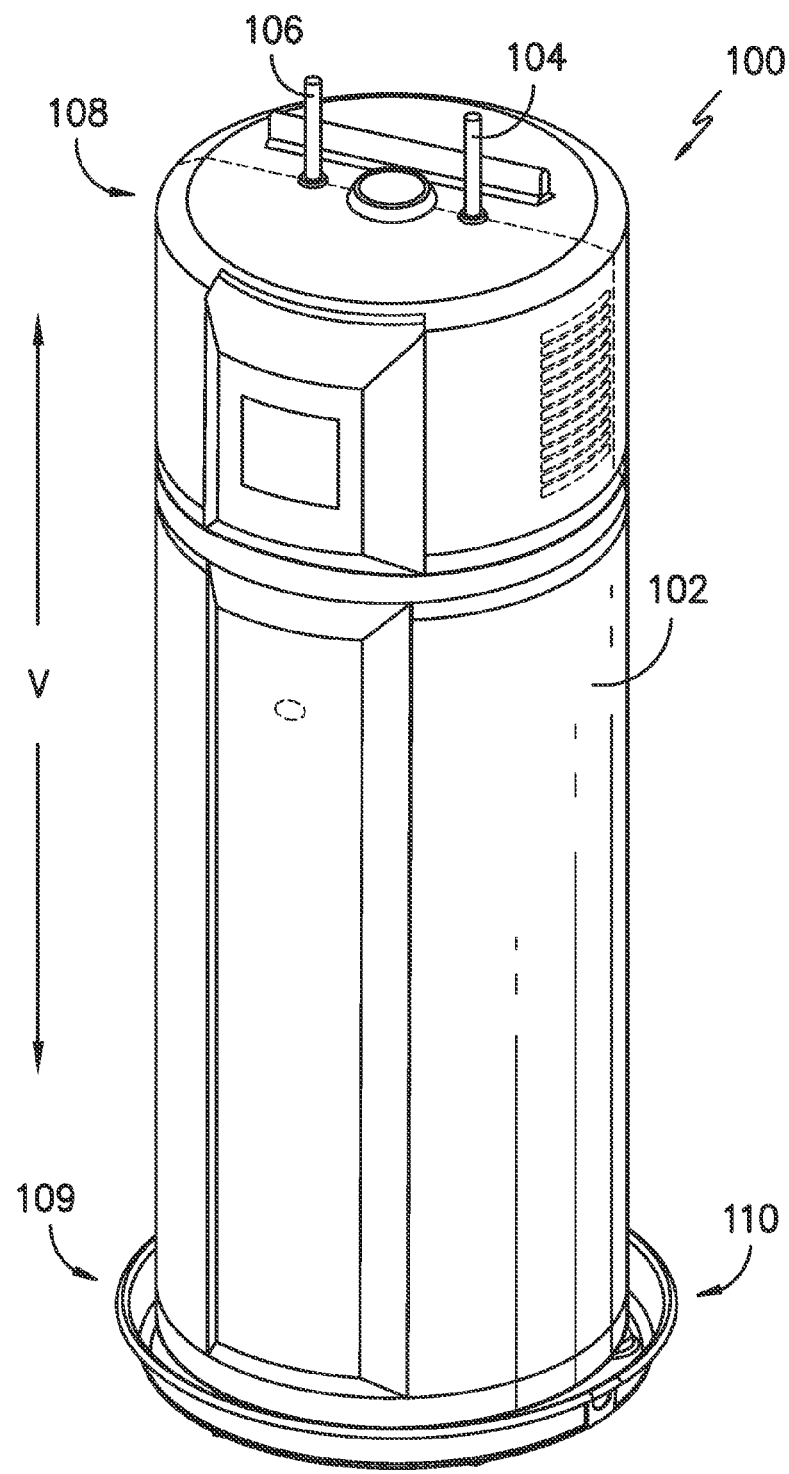
FIG. 1 provides a perspective view of a water heater appliance in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
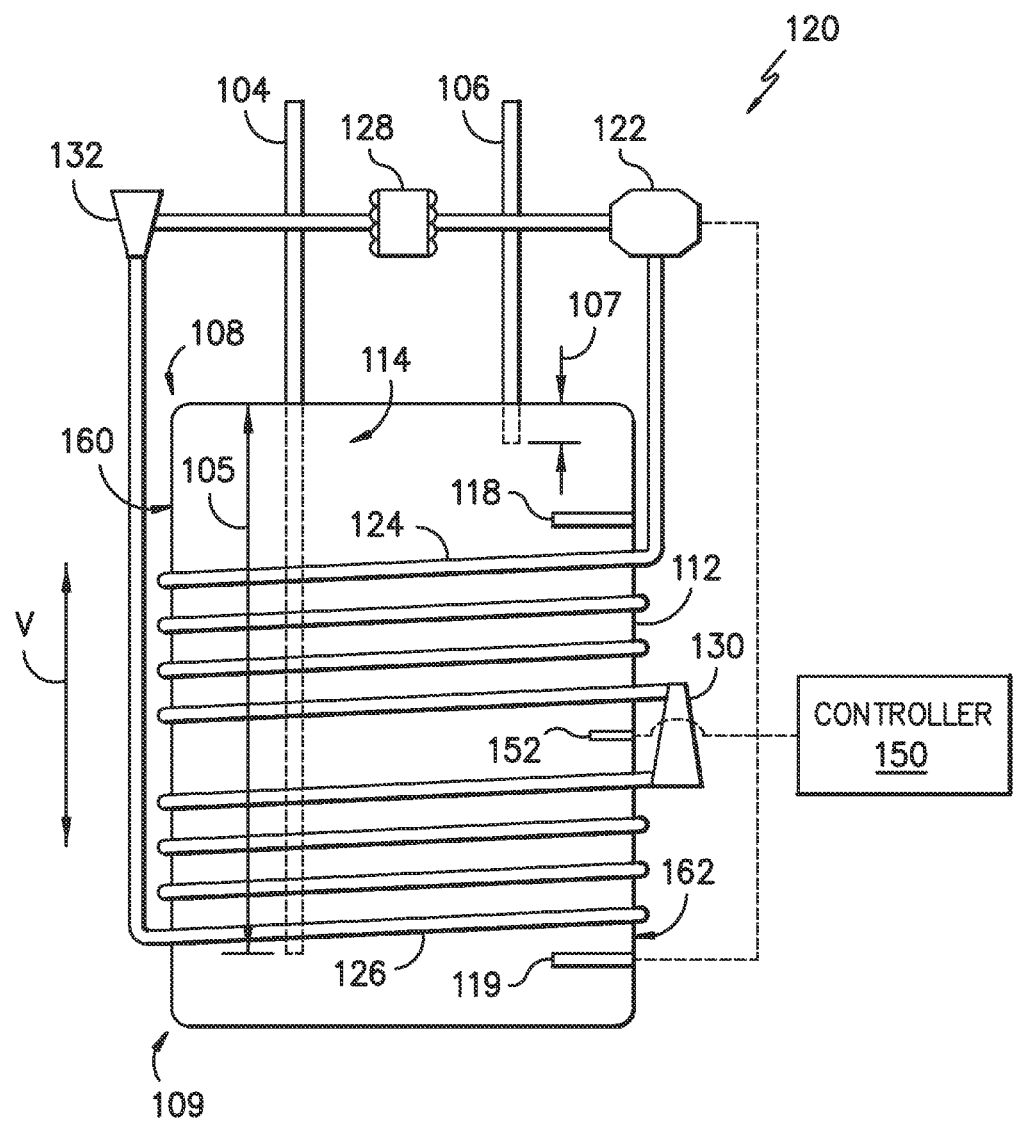
FIG. 2 provides a schematic view of various components of a water heater appliance in accordance with one embodiment of the present disclosure.

FIG. 1 provides a perspective view of a water heater appliance 100 according to an exemplary embodiment of the present subject matter. FIG. 2 provides a schematic view of various components of a water heater appliance 100. Water heater appliance 100 includes a casing 102. A tank 112 (FIG. 2) is mounted within casing 102. Tank 112 defines an interior volume 114 for heating water therein.

Water heater appliance 100 includes a cold water conduit 104 and a hot water conduit 106 that are both in fluid communication with tank 112 within casing 102. As an example, cold water from a water source, e.g., a municipal water supply or a well, enters water heater appliance 100 through cold water conduit 104. From cold water conduit 104, such cold water enters interior volume 114 of tank 112 wherein the water is heated to generate heated water. Such heated water exits water heater appliance 100 at hot water conduit 106 and, e.g., is supplied to a bath, shower, sink, or any other suitable feature.

Cold water conduit 104 and hot water conduit 106 each extend into the interior volume 114. Further, the cold water conduit defines a length 105 within the interior volume 114 and the hot water conduit 106 defines a length 107 within the interior volume 114. The lengths 105, 107 are the lengths of the portions of the cold and hot water conduits 104, 106 that are disposed within the interior volume 114. In exemplary embodiments, the length 105 of the cold water conduit 104 within the interior volume 114 is greater than the length 107 of the hot water conduit 106 within the interior volume 114.

Water heater appliance 100 extends between a top 108 and a bottom 109 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. Water heater appliance 100 further includes an upper portion 160 and a lower portion 162 each defined along the vertical direction V. The upper portion 160 is thus generally above the lower portion 162 along the vertical direction V.

A drain pan 110 is positioned adjacent to the bottom 109 of water heater appliance 100 such that water heater appliance 100 sits on drain pan 110. Drain pan 110 sits beneath water heater appliance 100 along the vertical direction V, e.g., to collect water that leaks from water heater appliance 100 or water that condenses on an evaporator 128 of water heater appliance 100. It should be understood that water heater appliance 100 is provided by way of example only and that the present subject matter may be used with any suitable water heater appliance.

Figure 3:
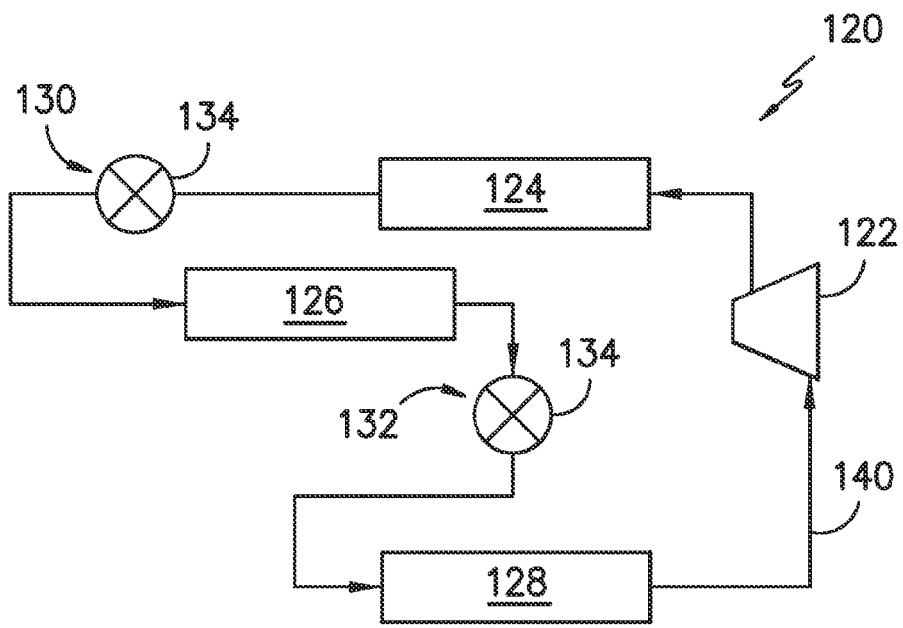
FIG. 3 provides a schematic diagram of a sealed system for use with a water heater appliance in accordance with one embodiment of the present disclosure.
Figure 4:
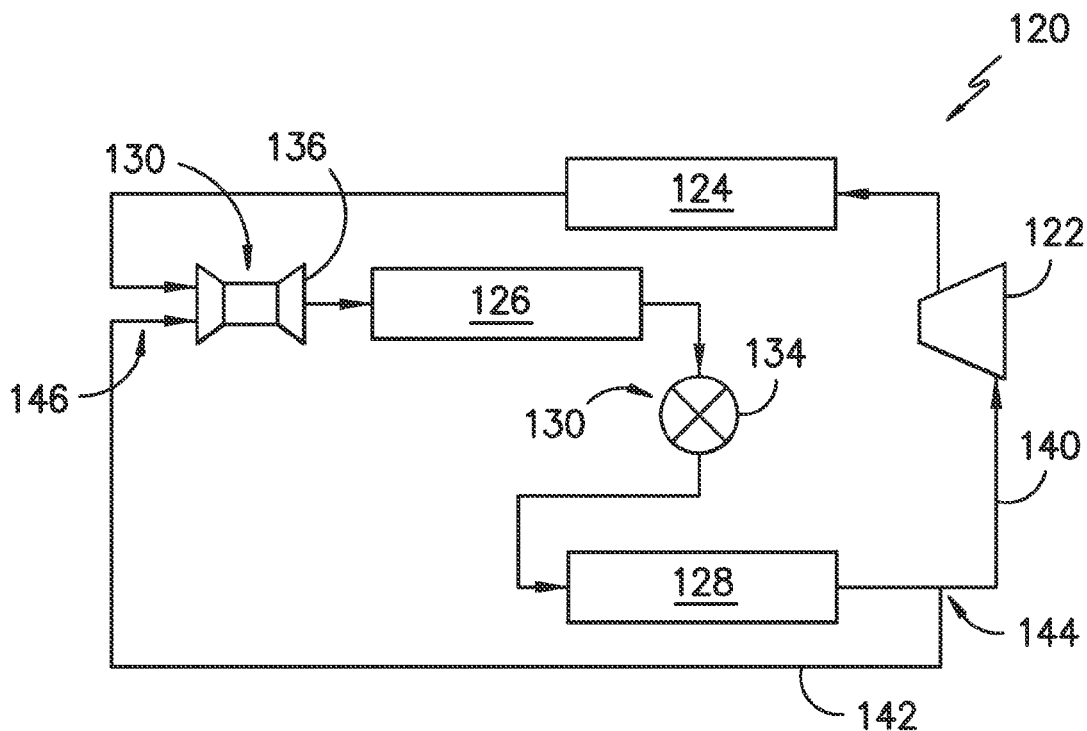
FIG. 4 provides a schematic diagram of a sealed system for use with a water heater appliance in accordance with another embodiment of the present disclosure.

Turning now to FIG. 2, as well as FIGS. 3 and 4, water heater appliance 100 may include a sealed system 120 for heating water within interior volume 114 of tank 112. The sealed system 120 generally operates in a heat pump cycle. Thus, water heater appliance 100 is commonly referred to as a "heat pump water heater appliance." Water heater appliance 100 may additionally include one or more auxiliary heating elements, such as an upper heating element 118 and/or a lower heating element 119. Upper and lower heating elements 118 and 119 can be any suitable heating elements. For example, upper heating element 118 and/or lower heating element 119 may be an electric resistance element, a microwave element, an induction element, or any other suitable heating element or combination thereof. Lower heating element 119 may also be a gas burner.

Sealed system 120 may include a compressor 122, a first condenser 124, and a second condenser 126. Each condenser 124, 126 may be assembled in a heat exchange relationship with tank 112 in order to heat water within interior volume 114 of tank 112 during operation of sealed system 120. Sealed system 120 may further include an evaporator 128. Still further, sealed system 120 may include a first throttling device 130 between the first condenser 124 and second condenser 126, and/or a second throttling device 132 between the second condenser 126 and the evaporator 128. The evaporator 128 may be between and in fluid communication with the second condenser 126 and the compressor 122. During operation of sealed system 120, refrigerant may flow from the evaporator 128 through the compressor 122. For example, refrigerant may exit evaporator 128 as a fluid in the form of a superheated vapor and/or high quality vapor mixture. Upon exiting the evaporator 128, the refrigerant may enter compressor 122. The compressor 122 may be operable to compress the refrigerant. Accordingly, the pressure and temperature of the refrigerant may be increased in the compressor 122 such that the refrigerant becomes a superheated vapor.

The first condenser 124 may be positioned downstream of and in fluid communication with the compressor 122, and may be operable to heat the water within the interior volume 114 using energy from the refrigerant. For example, the superheated vapor from compressor 122 may enter condenser 124 wherein it transfers energy to the water within tank 112 and condenses into a saturated liquid and/or liquid vapor mixture. The second condenser 126 may be positioned downstream of and in fluid communication with the first condenser 124, and may additionally be operable to heat the water within the interior volume 114 using energy from the refrigerant, such as by further condensing the refrigerant.

As discussed, in exemplary embodiments, a first throttling device 130 may be positioned between and in fluid communication with the first condenser 124 and the second condenser 126. Refrigerant, which may be in the form saturated liquid vapor mixture, may for example exit the first condenser 124 and travel through the first throttling device 130 before flowing through the second condenser 126. Throttling device 130 may generally expand the refrigerant, lowering the pressure and temperature thereof. The refrigerant may then be flowed through the second condenser 126.

Additionally or alternatively, a second throttling device 132 may be positioned between and in fluid communication with the second condenser 126 and the evaporator 128. Refrigerant, which may be in the form of high quality/saturated liquid vapor mixture, may for example exit the second condenser 126 and travel through the second throttling device 132 before flowing through the evaporator 128. Throttling device 132 may generally expand the refrigerant, lowering the pressure and temperature thereof. The refrigerant may then be flowed through the evaporator 128.

Throttling devices 130, 132 may be any suitable components for generally expanding the refrigerant. For example, in some embodiments, as illustrated in FIG. 3, a throttling device 130, 132 may be a Joule-Thomson expansion valve 134, also known as a "J-T valve" 134. In other embodiments, as illustrated in FIG. 4, a throttling device 130, 132 may be an ejector 136. In still other embodiments, a capillary tube, fixed orifice, or other suitable apparatus may be utilized as a throttling device 130, 132.

As is generally understood, various conduits may be utilized to flow the refrigerant between the various components of the sealed system 120. For example, a conduit 140 may be utilized to flow refrigerant from the evaporator 128 to the compressor 122. In some embodiments, a bypass conduit 142 may additionally be included in the sealed system 120. The bypass conduit 142 may divert a portion of the refrigerant flowing from the evaporator 128 to the compressor 122, and flow this portion of refrigerant to the throttling device 130. Energy from the diverted refrigerant may be utilized to generate and transfer additional heat to the water in the interior volume 114, thus increasing the efficiency of the system 120. The bypass conduit 142 may, for example, include an inlet 144 in fluid communication with the conduit 140 and an outlet 146 in fluid communication with the throttling device 130.

The use of two condensers 124, 126 in the sealed system 120 advantageously increases the efficiency of the system 120 and the water heater appliance 100 in general. For example, the condensers 124, 126 may take advantage of temperature gradients within the interior volume 114. The condensers 124, 126 may be designed and positioned such that the condensing temperatures thereof match the water temperatures generally proximate the condensers 124, 126. Accordingly, for each condenser 124, 126, a sufficient amount of heat is available in the refrigerant for a given amount of compressor 122 work.

In particular, the second compressor 126 may be positioned to take advantage of lower water temperatures which may exist in the water heater appliance 100. In many cases, such as immediately after cold water is flowed into the tank 112, a temperature gradient may exist, such as along the vertical direction V. Hotter water may be located towards the top 108, such as in the upper portion 160, above colder water which may be located towards the bottom 109, such as in the lower portion 162. The first condenser 124 may be positioned proximate an approximate location of the hotter water. The refrigerant may condense in the first condenser 124 at a temperature high enough to transfer heat to this hotter water. The second condenser 126 may be positioned proximate an approximate location of the colder water. The refrigerant may condense in the second condenser 126 at a temperature lower than that in the first condenser 124 but hot enough to warm the colder water. Accordingly, the efficiency of the heat pump cycle, the sealed system 120, and the appliance 100 in general may thus advantageously be improved, and associated energy costs may be decreased.

In exemplary embodiments, the first condenser 124 may thus for example be positioned above the second condenser 126 along the vertical direction V. Further, as illustrated, the first and second condensers 124, 126 may each surround the tank 112. For example, each condenser 124, 126 may be wrapped around the tank 112, such as in a generally helical manner as illustrated. Further, in exemplary embodiments, the first condenser 124 may surround the upper portion 160 of the tank 112 and the second condenser 126 may surround the lower portion 162 of the tank 112. Such positioning of the condensers 124, 126 may advantageously facilitate improved interaction with water in the interior volume 114, such as water at varying temperatures, thus improving the efficiency and increasing the energy costs of the system 120 and appliance 100 in general.

Water heater appliance 100 may additionally include a temperature sensor 152. Temperature sensor 152 may be configured for measuring a temperature of water within interior volume 114 of tank 112. Temperature sensor 152 can be positioned at any suitable location within water heater appliance 100. For example, temperature sensor 152 may be positioned within interior volume 114 of tank 112 or may be mounted to tank 112 outside of interior volume 114 of tank 112. Temperature sensor 152 may further be positioned within upper portion 160 or lower portion 162. When mounted to tank 112 outside of interior volume 114 of tank 112, temperature sensor 152 can be configured for indirectly measuring the temperature of water within interior volume 114 of tank 112. For example, temperature sensor 152 can measure the temperature of tank 112 and correlate the temperature of tank 112 to the temperature of water within interior volume 114 of tank 112. Temperature sensor 152 can be any suitable temperature sensor. For example, temperature sensor 152 may be a thermocouple or a thermistor.

Water heater appliance 100 may further include a controller 150 that regulates operation of water heater appliance 100. Controller 150 may be, for example, in operative communication with system 120 (such as the compressor 122 and/or other components thereof), auxiliary heating elements, and/or temperature sensor 152. Thus, controller 150 can selectively activate system 120 and/or auxiliary heating elements in order to heat water within interior volume 114 of tank 112.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The present disclosure is further directed to methods for operating water heater appliances. A method may include, for example, the step of flowing a refrigerant through a compressor 122, as discussed above. A method may further include, for example, the step of flowing the refrigerant from the compressor 122 through a first condenser 124 surrounding a tank 112 of the water heater appliance 100, as discussed above. A method may further include, for example, the step of flowing the refrigerant from the first condenser 124 through a second condenser 126 surrounding the tank 112 of the water heater appliance 100, as discussed above.

In some embodiments, a method according to the present disclosure may further include the step of flowing the refrigerant from the second condenser 126 through an evaporator 128, as discussed above. Additionally, in some embodiments, a method according to the present disclosure may include flowing the refrigerant from the second condenser 126 through a throttling device 132 before flowing the refrigerant through the evaporator 128, as discussed above.

Further, in some embodiments, a method according to the present disclosure may include flowing the refrigerant from the first condenser 124 through a throttling device 130 before flowing the refrigerant through the second condenser 126, as discussed above. Still further, a method according to the present disclosure may include diverting a portion of the refrigerant from the evaporator 128 to the throttling device 130, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater appliance, comprising:
a tank defining an interior volume; and
a sealed system for heating water within the interior volume, the sealed system comprising:
a compressor operable to compress refrigerant;
a first condenser downstream of and in fluid communication with the compressor, the first condenser operable to heat water within the interior volume using energy from the refrigerant;
a second condenser downstream of and in fluid communication with the first condenser, the second condenser operable to heat water within the interior volume using energy from the refrigerant;
a throttling device between and in fluid communication with the first condenser and the second condenser;
an evaporator between and in fluid communication with the second condenser and the compressor; and
a bypass conduit, the bypass conduit comprising an inlet in fluid communication with a conduit flowing refrigerant from the evaporator to the compressor and an outlet in fluid communication with the throttling device.

2. The water heater appliance of claim 1, wherein the first condenser is positioned above the second condenser along a vertical direction.

3. The water heater appliance of claim 1, wherein the first condenser and the second condenser each surround the tank.

4. The water heater appliance of claim 1, wherein the tank comprises an upper portion and a lower portion each defined along a vertical direction, and wherein the first condenser surrounds the upper portion and the second condenser surrounds the lower portion.

5. The water heater appliance of claim 1, wherein the throttling device is a J-T valve.

6. The water heater appliance of claim 1, wherein the throttling device is an ejector.

7. The water heater appliance of claim 1, wherein the sealed system further comprises a second throttling device between and in fluid communication with the second condenser and the evaporator.

8. The water heater appliance of claim 1, further comprising an auxiliary heating element.

9. The water heater appliance of claim 1, further comprising a hot water conduit and a cold water conduit each extending into the interior volume, the cold water conduit having a length within the interior volume greater than a length of the hot water conduit within the interior volume.

10. A method for operating a water heater appliance, the method comprising:

flowing a refrigerant through a compressor;

flowing the refrigerant from the compressor through a first condenser surrounding a tank of the water heater appliance;

flowing the refrigerant from the first condenser through a second condenser surrounding the tank of the water heater appliance;

flowing the refrigerant from the first condenser through a throttling device before flowing the refrigerant through the second condenser;

flowing the refrigerant from the second condenser through an evaporator; and diverting a portion of the refrigerant from the evaporator to the throttling device.

11. The method of claim 10, further comprising flowing the refrigerant from the second condenser through a throttling device before flowing the refrigerant through the evaporator.

12. The method of claim 10, wherein the throttling device is a J-T valve.

13. The method of claim 10, wherein the throttling device is an ejector.

14. The method of claim 10, wherein the tank comprises an upper portion and a lower portion each defined along a vertical direction, and wherein the first condenser surrounds the upper portion and the second condenser surrounds the lower portion.

* * * * *